United States Patent
Schwaar et al.

(10) Patent No.: US 6,354,168 B1
(45) Date of Patent: Mar. 12, 2002

(54) TRIPOD BEARING DEVICE AND A METHOD OF TORSION COMPENSATION

(75) Inventors: Michael Schwaar, Hartmannsdorf; Jan Kirchner, Oestrich-Winkel; Reimund Neugebauer, Dresden, all of (DE)

(73) Assignee: Fraunhofer-Gesellschaft zur Förderung der angewandten, Forschung e.V., Munich (DE)

( * ) Notice: Subject to any disclaimer, the term of this patent is extended or adjusted under 35 U.S.C. 154(b) by 0 days.

(21) Appl. No.: 09/620,153

(22) Filed: Jul. 20, 2000

Related U.S. Application Data

(63) Continuation of application No. PCT/EP99/08723, filed on Nov. 12, 1999.

(30) Foreign Application Priority Data

Jan. 29, 1999 (DE) .......................... 199 03 613

(51) Int. Cl.[7] .............................. B25J 17/02; B25J 13/08
(52) U.S. Cl. .............................. 74/490.06; 74/490.03; 901/22; 901/23; 901/29
(58) Field of Search .................. 74/490.01, 490.03, 74/490.06; 901/22, 23, 29

(56) References Cited

U.S. PATENT DOCUMENTS

| | | | | |
|---|---|---|---|---|
| 4,569,627 A | * | 2/1986 | Simunovic | 414/735 |
| 5,581,166 A | * | 12/1996 | Eismann et al. | 318/568.22 |
| 6,059,703 A | * | 5/2000 | Heisel et al. | 483/31 |

\* cited by examiner

Primary Examiner—Allan D. Herrmann
(74) Attorney, Agent, or Firm—Akin, Gump, Strauss, Hauer & Feld L.L.P.

(57) ABSTRACT

A tripod bearing device featuring a stationary frame and a carrier moveable relative to it, which are connected together via three braces that are adjustable in their lengths. Each brace is coupled to the frame and to the carrier via a joint each with two rotational degrees of freedom. Moreover, a torsion drive is assigned to each brace for twisting the carrier-end joint of the relevant brace relative to the frame-end joint of this brace about its longitudinal axis. Consequently, a constructively simple parallel structure with three machining axes can be realized which, with its high dynamic stiffness, enables an accurate positioning of the carrier. Furthermore, a method for torsion compensation in the braces is given.

15 Claims, 2 Drawing Sheets

TRIPOD BEARING DEVICE AND A METHOD OF TORSION COMPENSATION

CROSS-REFERENCE TO RELATED APPLICATION

This application is a continuation of International Application No. PCT/EP99/08723 filed Nov. 12, 1999 the disclosure of which is incorporated herein by reference.

BACKGROUND OF THE INVENTION

The invention relates to a tripod bearing device with a stationary frame and a carrier moveable relative to it. These are connected together via three braces which are adjustable in length. Furthermore, the invention relates to a method of torsion compensation in the above device.

These types of devices and methods are used in machine tools for accommodating and moving a tool which generally can be fastened to the carrier and positioned by a relative movement with respect to a workpiece held on the frame. Further fields of application for tripod bearing devices are handling systems and robots where, for example, a manipulator, clamping device or gripper can be fitted to the carrier.

In contrast to conventional, three-axis tool guidance systems in which a dedicated, driven slide is provided for each linear axis with these slides being connected in series, tripod bearing devices consist of so-called parallel structures in which generally not just one, but a number of positioning mechanisms, for example braces which are adjustable in length, must be operated for a linear movement in an axial direction.

So-called hexapods, which feature a six-legged suspension of the carrier on the frame, belong to the field of parallel structures. A hexapod machining center and a device and method for controlling the same are known from DE 196 36 100 A1 and DE 196 36 102 A1 from the same applicant.

In the arrangement of a machine tool on the carrier, the hexapods mentioned facilitate five-axis machining on a workpiece fixed to the frame. Here, translations in all spatial directions as well as swivel movements are possible around axes running perpendicular to the spindle axis of the machine tool. With such hexapods the individual braces are exclusively loaded in tension and compression so that it is possible to use relatively long braces which exhibit a relatively low torsional stiffness which is favorable with hexapods with regard to as free as possible carrier movement in space from the viewpoint of brace collisions.

However, due to their complexity, hexapods are not only expensive with regard to their structure, but also with regard to their control and therefore they are of less benefit for applications in which a lower level of machining versatility is adequate.

With applications in which only three-axis machining is required, there is the possibility of reducing the number of braces and also therefore the complexity of the device compared to a hexapod. The complications that occur here from the linking of rotary degrees of freedom prevent the usual design principles applied to hexapods from being easily applied to structures with fewer braces. Through the linking of the rotary degrees of freedom, and in contrast to hexapods, tensile and compressive forces arise as well as torsion moments for which the braces usually used with hexapods and which have less torsional stiffness are unsuitable. A more torsionally stiff version would however negatively impair the movability due to the spatial restrictions, in particular on a compact carrier.

With regard to the torsion problem, a suggestion has already been made that with a tripod bearing device, i.e. a device with three braces, each brace should be formed as double rods so that moments that occur can be subdivided into tensile/compressive force components. However, these solutions use braces which cannot be varied in length and with which the positioning of the carrier is realized by offsetting the base point on the frame relative to the braces. This type of solution for braces adjustable in length is however impracticable.

Braces, non-varying in length with base-point guidance, also exhibit the disadvantage that errors in the bearing of the carrier are introduced due to the base-point guide tracks. These errors can only be compensated with difficulty and expense.

In contrast, the object of the invention is the creation of a tripod bearing device with braces adjustable in length which enables a high accuracy of positioning with low technical complexity.

With the tripod bearing device mentioned at the start, this object is solved in that each brace is coupled to the frame and to the carrier with a joint with two rotational degrees of freedom and a torsion compensation control device, with the torsion drives each allocated to the individual braces, interacts to twist the carrier-end joint of the relevant brace relative to the frame-end joint of this brace about its longitudinal axis for stabilizing/controlling torsion occurring in the braces.

With the solution according to the invention the torsions occurring due to the torsion drives of the individual braces in the parallel structure, which lead to a rotational deviation of the carrier from its set position, can be compensated in a targeted manner, and preferentially reduced to zero. In particular the displacement of a main spindle provided on the carrier, which occurs due to machining forces, can be compensated, giving a significantly higher stiffness of the carrier bearing system compared to conventional devices without having to carry out structural reinforcing on the braces. Consequently, a higher movability of the carrier in space can be realized even with a spatially compact carrier. Additionally, manufacturing accuracy and thermally influenced dimensional changes can be compensated by the controller in all six degrees of freedom. In contrast, with conventional three-axis serial structures this is only possible for the three translational degrees of freedom.

SUMMARY OF THE INVENTION

According to an advantageous embodiment of the invention, the torsion drive between the carrier-end joint and the frame-end joint is preferentially positioned at the carrier end of the brace. The latter is particularly of advantage when the torsion drive is light in weight compared to the brace. With small masses at the carrier end high acceleration levels can be achieved, giving a higher manufacturing speed.

Preferentially, the torsion drive is formed as a rotational drive device for small distances with a high driving speed. The rotational drive here represents a supplementary drive to the translational main drive of the braces which can move large distances with a relatively large dead-weight. This produces a high cut-off frequency for the complete arrangement.

According to an advantageous embodiment, the carrier is supported on the braces in space in true orientation, i.e. with a movement of the carrier in space, it always retains its alignment to the translational spatial axes.

According to another advantageous embodiment, a device for determining a torsion of the relevant brace about its longitudinal axis is provided on each brace for the generation of a signal in dependence of which the torsion drive of the relevant brace is operated. Through the direct acquisition of the actually occurring torsions they can be compensated on-line during the operation of the tripod bearing device, i.e. during a machining process. In principle the torsion drives can also be employed to a certain extent for the generation of torsions, provided that within the scope of a machining process slight swivel movements about the translation axes are desired.

Following another advantageous embodiment, an open-loop and/or closed-loop device for changing the lengths of the braces incorporates a torsion compensation control device which includes a closed-loop controller and the device for determining the torsions of the braces. Here, a system deviation is connected to the input end of the closed-loop controller, formed from parameters representing the torsion set values and parameters representing torsion actual values from the torsion determination device, and the output of the closed-loop controller is connected to the torsion drives. In this way disturbance quantities arising, such as moments resulting from a machining process, can be compensated in the desired way depending on the configuration of the closed-loop controller. The closed-loop control system can be realized analogue or digitally, with the former offering the advantage of a larger system dynamic response.

In contrast to hexapods, with tripods it is often possible to determine a closed analytical solution of the forwards transformation. This means that in the case of a digital closed-loop control system, the sampling rate and therefore the control quality can be improved.

The higher level open-loop and/or closed-loop control system just gives set values, such as for example offset quantities from the calibration or the thermal displacement of the system to the rotational drives, whereby these quantities exhibit more of a static character and only change very slowly.

Following another advantageous embodiment, the feedback of the parameters representing the torsion actual values to the input end of the closed-loop controller occurs autonomously without the motion control and/or closed-loop control of the brace length alteration being affected. For this, a cascade-type control concept, to which the torsion compensation closed-loop controller is arranged autonomously subordinate, is used for the change of length in the braces.

The object mentioned at the start is further solved by a method of torsion compensation in a device according to one of the claims 1 to 12 in which torsions caused by the load and arising in the braces are acquired, compared with set torsion values and the determined torsion difference is compensated by activating the torsion drives. This method enables the dynamic stiffness of a tripod bearing device to be increased in an economic way, thereby improving the production accuracy, without the movability of the device being impaired.

BRIEF DESCRIPTION OF THE SEVERAL VIEWS OF THE DRAWINGS

Other advantageous embodiments are given in the subclaims. In the following an embodiment of the invention is explained in more detail based on the enclosed drawings. These show in:

DETAILED DESCRIPTION OF THE INVENTION

Figure 1:
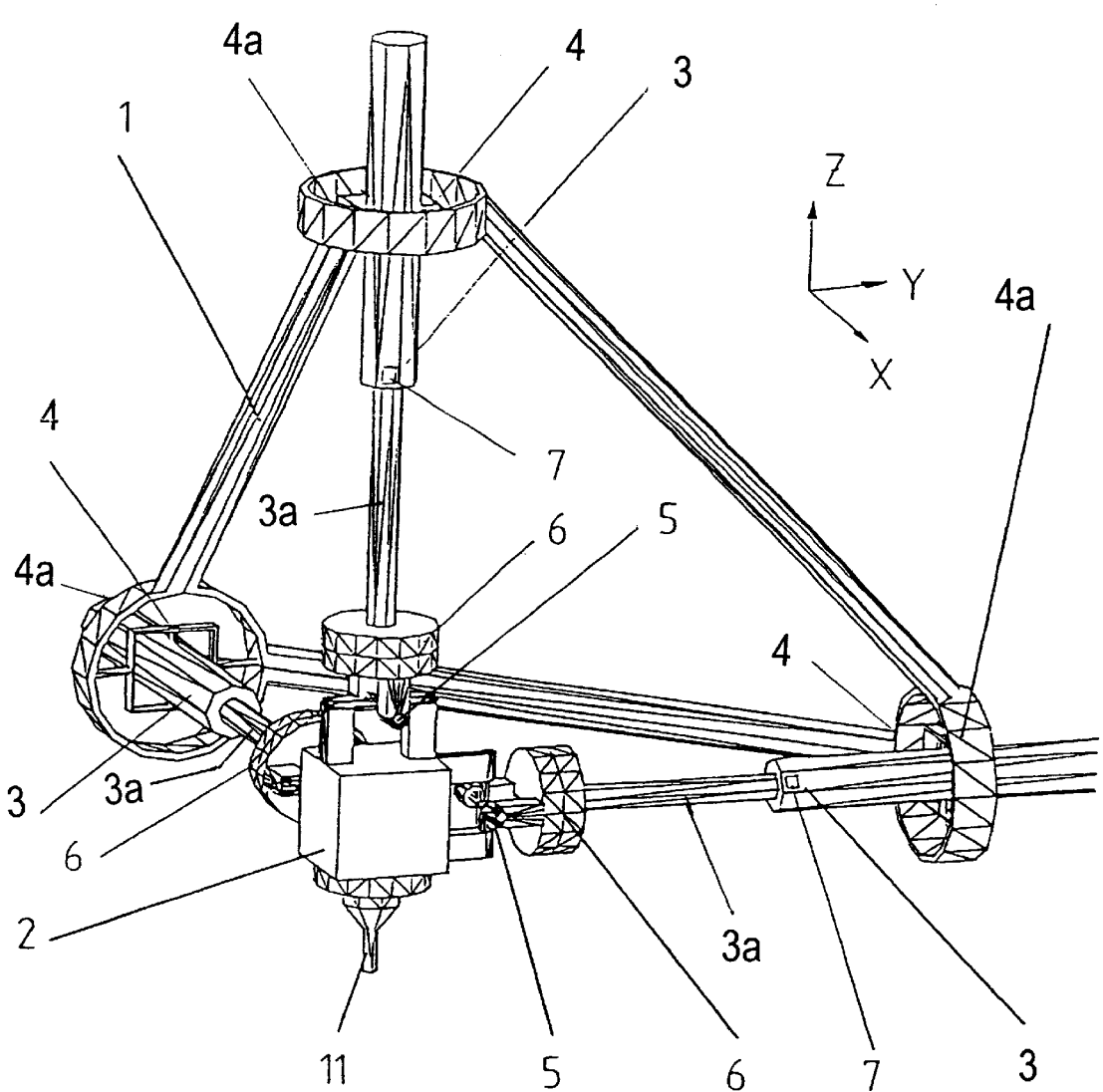
FIG. 1 a spatial view of a tripod bearing device according to the invention and in FIG. 2 the torsion compensation closed-loop control circuit for the tripod bearing device illustrated in FIG. 1.

A tripod bearing device with a frame 1 and a carrier 2, moveable relative to it, is illustrated in FIG. 1. The device is integrated into a machine bed and can principally be used in a machine tool, a handling system or a robot. In the illustrated implementation example a spindle 11 is arranged on the carrier 2 for accommodating a machining tool, for example a drill or milling cutter or similar. The frame 1 is formed spatially as a triangle in a truss structure, at the corners of which a ring is provided for the bearing support of a joint. The truss structure is equipped such that the connections between the joint holding rings are always the same length. The joint holding rings each lie in their own plane, whereby each of the three levels are located perpendicular in space with respect to the two other planes, preferably each one at an angle of 90°.

The carrier 2 is formed as a spatial body for the accommodation of the above-mentioned spindle 11 and in the implementation example it has a cubic shape. One side each of the carrier 2 is orientated towards a plane of the joint holding rings on the frame 1.

The carrier 2 is supported via three braces 3 on frame 1, whereby all the braces are designed in the same manner. This facilitates a high number of repeated parts and a kit-type system structure. Each brace 3 is coupled via a first joint 4 on the frame 1 and via a second joint 5, connected to the carrier 2. FIG. 1 shows an idle position for the tripod bearing device. In this idle position the braces are in a torsion-free state. The braces extend in the three spatial directions, X, Y, Z, which form an orthogonal system. They are adjustable in length in their longitudinal direction, i.e. in the direction of their longitudinal axis, whereby here linear drives are involved which are suitable for the transfer of torsion forces. For example, hydraulic motors can be used, whereby the heavy cylinder is arranged on the frame side and the piston rod on the carrier side.

The coupling of the braces 3 is realized, as already mentioned, via joints 4 and 5 each with two degrees of freedom. In the illustrated implementation example universal joints are shown for this purpose which provide swivelling about two axes, perpendicular to the longitudinal direction of the corresponding brace 3 and to one another. The joints 4 on the frame are formed corresponding to the joints 5 on the carrier side. Since with a change in length on the braces these are swivelled in the joints 4 on the frame, the masses of the cylinders of the braces 3 are balanced in the joint holding rings of the frame 1 in that the cylinders run through the joint holding rings.

Furthermore, to each brace 3 a torsion drive 6 is assigned which, in the illustrated implementation example, is arranged between the carrier-end joint 5 and the frame-end joint 4 at the end of the corresponding brace 3. The torsion drive 6 can also be arranged between the frame 1 and the frame-end joint 4 or between the carrier 2 and the carrier-end joint 5.

The torsion drive 6 is formed as a rotational drive device for small distances with a high drive speed. In addition, in comparison to the longitudinal drive of the braces, it exhibits a significantly lower mass, resulting in a high cut-off frequency of the drive arrangement which enables fast compensation of unwanted torsion occurring on the braces due to a machining process. In addition, apart from such deviations, also production tolerances of the bearing support of the carrier or the spindle 11 and thermal deformation of the whole parallel structure can be compensated based on a thermal model.

FIG. 1 shows, as already explained, the tripod bearing device in an idle position in which the braces extend in the three spatial directions X, Y, Z perpendicular to one another. Since all braces are of similar construction, the extension length for each of the braces 3 is in this case the same. The suspension via the joints 4 and 5 each with two joint degrees of freedom enables the carrier 2 to be displaced in the three translational spatial directions X, Y, Z in true orientation, so that three-axis machining of a workpiece is possible. Swivelling of the carrier 2 about one of the mentioned axes X, Y, Z is not wanted here.

On the braces 3 a dedicated device 7 for determining a torsion of the relevant braces about its longitudinal axis is provided. The main feature is that the measurement occurs in the force flux. This can occur at suitable points on the joints 4 and 5 and on the frame 1 or the carrier 2. This device 7 produces a command or a signal in dependence of which the torsion drive 6 of the relevant brace 3 is operated. The device for the determination of a torsion incorporates a measurement transducer, which is not illustrated in further detail, for the acquisition of the moment acting in a brace. For this purpose, a force transducer or strain gauge can be used, for example. Furthermore, the device 7 incorporates an evaluation device for the determination of the torsion in the brace from the acquired moment and the known and specified torsional stiffness of the brace 3. The evaluation device which is not illustrated acts here as a method of converting the measurement transducer signals into suitable parameters for a closed-loop control device which represent the torsions occurring in the braces. As illustrated in FIG. 1, part of the device 7, i.e. in particular the measurement transducer, is applied directly to a brace 3, here preferentially on the cylinder. The evaluation device is preferentially arranged separately and can, for example, be integrated into an open-loop and/or closed-loop control device 8 which also handles the change in length of the braces 3 for positioning the carrier 2 with respect to the frame 1.

In this open-loop and closed-loop control device 8 a torsion compensation closed-loop control device 10 is integrated which incorporates a controller 9 as well as the device for the determination of the torsions in the braces 3.

Figure 2:
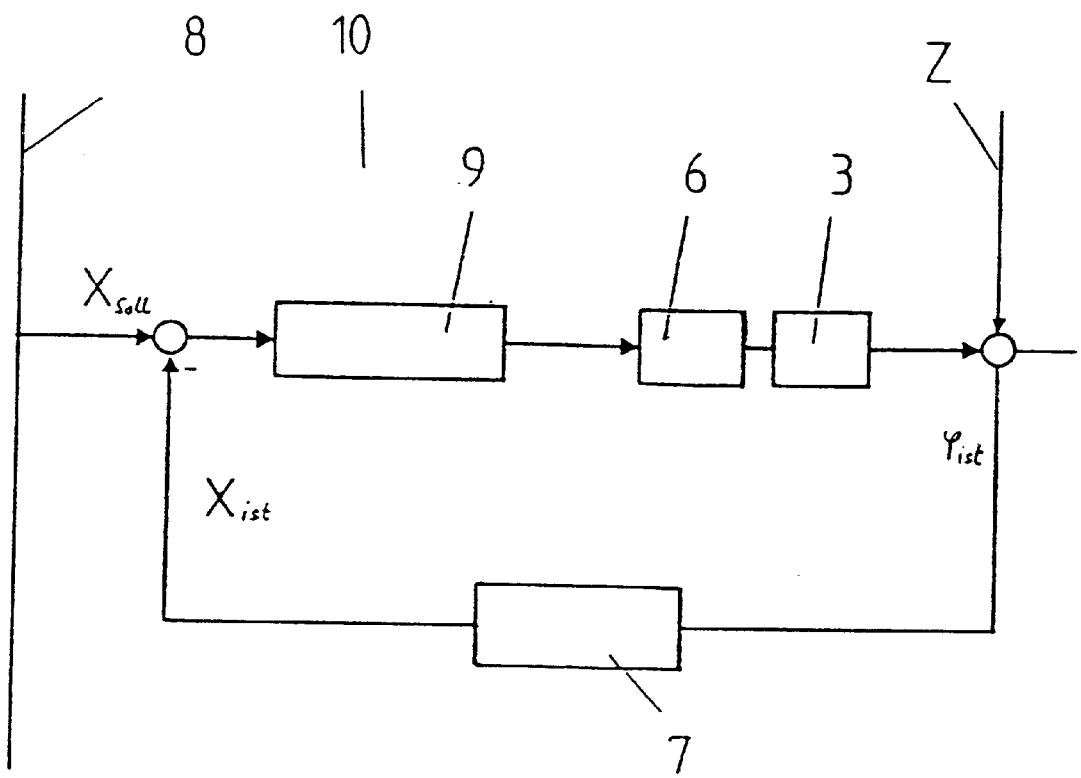

The torsion compensation closed-loop control device 10 is, as shown in FIG. 2, integrated in a cascade-type of control concept of the open-loop and closed-loop control device 8, whereby the feedback of the torsion signal from the braces 3 occurs autonomously to a manipulated variable for the torsion drives 6, i.e. independent of the higher level open-loop or closed-loop control of the brace 3 change of length. As illustrated in FIG. 2, an error signal which is formed from the parameters $X_{set}$, which represents the torsion set values in the braces and parameters $X_{act}$, which represents the torsion actual values generated by the torsion determination device 7, is switched to the input end of the controller 9. The parameters $X_{set}$, which represent the torsion set values, are derived from the open-loop and closed-loop control device 8. This quantity hardly changes during the operation of the system because the corresponding values for the individual braces should remain theoretically constant to prevent a swivelling of the carrier 2 or of the main spindle 11. Only offset values due to production or thermal effects can slightly vary in time. These quantities however have more of a static character and only change very slowly.

The torsions resulting from the reactive forces during operation occur as disturbance quantities Z in the system in the vicinity of the controlled system, i.e. the structure of the braces 3 and lead to torsion angles between the frame-end joint 4 and the carrier-end joint 5 in the form of a differential angle $\phi_{act}$. This torsion angle is acquired directly, but in the illustrated example indirectly, by the devices 7 for determination of the torsions in the braces 3. The forces or moments occurring in the brace structure can be definitively acquired, for example, with the aid of force transducers or strain gauges. Since the geometry and therefore the torsional stiffness of the braces 3 are known, displacement quantities can be found with the aid of the evaluation circuit, which is not illustrated, based on the force quantities and the information about the brace structure. These displacement quantities are converted into the parameters $X_{act}$ which are suitable for the torsion compensation closed-loop control device 10 and which represent the torsion actual values. These parameters are fed back to the corresponding torsion set-value parameters.

Control can be implemented both analogue and digitally. The manipulated variables produced by the controller 9 are finally passed to the torsion drives 6 for compensation of displacements of the main spindle which is continuously carried out during the operation of the device. With a failure of the torsion compensation closed-loop control device 10, the tripod bearing device can, due to the autonomous design in the open-loop and closed-loop control device 8, continue to be operated in the conventional manner without torsion compensation.

To illustrate the principle of operation of the torsion compensation closed-loop control device 10 it is assumed that a force in the direction of the left horizontal brace in FIG. 1 acts on the spindle 11, respectively the carrier 2. Consequently, a reactive force is produced in this left brace. In the right brace, in contrast, a torque is produced. If the force in the braces is measured, the displacement of the main spindle, which is produced due to the force and therefore due to the associated spring effect in this brace, can be compensated due to the translational main movement of the left brace. Without a hybrid drive, i.e. without inclusion of the torsion drives, the twisting of the right brace, which arises on account of the torque and the associated torsional spring effect, would not be able to be compensated. The hybrid drive turns the main spindle back into its perpendicular position against the torque acting in the brace.

In the adaptation of the embodiment illustrated in FIG. 1 a gripper construction for a robot or a laser machining device can be provided on the carrier instead of a main spindle.

What is claimed is:

1. A tripod bearing device comprising a stationary frame and a carrier moveable relative to the frame, which are joined together via three braces that are adjustable in length whereby each brace is coupled to the frame and the carrier via a joint with two rotational degrees of freedom and with a torsion compensation closed-loop control device, which interacts with torsion drives assigned to the individual braces for twisting the joint of the brace on the carrier relative to the joint of the brace on the frame about a longitudinal axis of the brace for compensating torsions occurring in the braces.

2. The tripod bearing device according to claim 1, characterized in that the torsion drive is arranged between a carrier-end joint and a frame-end joint.

3. The tripod bearing device according to claim 1, characterized in that the torsion drive is arranged at a carrier end of the brace.

4. The tripod bearing device according to claim 1, characterized in that the torsion drive is formed as a rotational device for small distances with a high drive speed.

5. The tripod bearing device according to claim 1, characterized in that the carrier-end and frame-end joints are formed as universal joints.

6. The tripod bearing device according to claim 1, characterized in that the braces are arranged perpendicular to one another in three spatial directions in an idle position of the carrier.

7. The tripod bearing device according to claim 1, characterized in that all of the braces are formed in a similar manner.

8. The tripod bearing device according to claim 1, characterized in that the carrier is supported by joints on the braces with true orientation in space.

9. The tripod bearing device according to claim 1, characterized in that a device for the determination of a longitudinal axis torsion of the braces is provided on each of the braces for the generation of a signal, in dependence of which the torsion drive of the braces is operated.

10. The tripod bearing device according to claim 9, characterized in that the device for the determination of a torsion incorporates a measurement transducer for the acquisition of a moment acting in the braces as well as an evaluation device for determining a brace torsion from the acquired moment together with a specified torsional stiffness of the braces.

11. The tripod bearing device according to claim 1, characterized in that the torsion compensation closed-loop control device incorporates a controller and devices for the determination of torsions of the braces with a system deviation connected to the controller on an input side that is integrated in one of an open-loop and closed-loop control devices for changing a length of the braces, the system deviation is formed from set parameters, which represent torsion set values and actual parameters, which represent torsion actual values produced from a torsion determination device, a controller output is connected to the torsion drives.

12. The tripod bearing device according to claim 11, characterized in that a feedback of the actual parameters to the controller input side occurs autonomously without affecting a movement of one of the open-loop and closed-loop controls to change the length of the braces.

13. A tripod bearing device comprising:

a stationary frame and a carrier moveable relative to the frame, the stationary frame and carrier frame are joined together via three braces that are adjustable in length, each brace is coupled to the frame and the carrier via a joint with two rotational degrees of freedom, each brace is also coupled with a torsion compensation closed-loop control device that determines the torsion in each brace, the torsion compensation closed-loop control device interacts with torsion drives assigned to the individual braces for twisting the joint of the brace on the carrier relative to the joint of the brace on the frame about a longitudinal axis of the brace for compensating torsions occurring in the braces.

14. A method of torsion compensation in a device including the steps of:

acquiring torsions caused by a load acting on a device having braces;

comparing the acquired torsions with set torsions;

determining a torsion difference; and compensating for the torsion difference by activating torsion drives.

15. The method according to claim 14, characterized in that the method of torsion compensation in a device is implemented continually on-line.

* * * * *